United States Patent
Reial et al.

(10) Patent No.: US 11,963,159 B2
(45) Date of Patent: Apr. 16, 2024

(54) EFFICIENT BWP SWITCHING

(71) Applicant: Telefonaktiebolaget LM Ericsson (publ), Stockholm (SE)

(72) Inventors: Andres Reial, Lomma (SE); Ali Nader, Malmö (SE); Yutao Sui, Solna (SE); Robert Baldemair, Solna (SE); Niklas Andgart, Södra Sandby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 459 days.

(21) Appl. No.: 17/280,671

(22) PCT Filed: Sep. 26, 2019

(86) PCT No.: PCT/EP2019/076060
§ 371 (c)(1),
(2) Date: Mar. 26, 2021

(87) PCT Pub. No.: WO2020/064941
PCT Pub. Date: Apr. 2, 2020

(65) Prior Publication Data
US 2021/0385829 A1    Dec. 9, 2021

Related U.S. Application Data

(60) Provisional application No. 62/738,891, filed on Sep. 28, 2018.

(51) Int. Cl.
*H04W 72/1263* (2023.01)
*H04W 72/23* (2023.01)
*H04W 76/28* (2018.01)

(52) U.S. Cl.
CPC ....... *H04W 72/1263* (2013.01); *H04W 72/23* (2023.01); *H04W 76/28* (2018.02)

(58) Field of Classification Search
None
See application file for complete search history.

(56) References Cited

U.S. PATENT DOCUMENTS

| 10,721,765 B2* | 7/2020 | Park | H04W 72/0453 |
| 11,160,067 B2* | 10/2021 | Hwang | H04L 5/0094 |
| 11,297,674 B2* | 4/2022 | He | H04W 76/28 |
| 2021/0092008 A1* | 3/2021 | Yi | H04J 1/02 |

OTHER PUBLICATIONS

International Search Report and Written Opinion dated Dec. 18, 2019 for International Application No. PCT/EP2019/076060 filed Sep. 26, 2019, consisting of 11-pages.
(Continued)

*Primary Examiner* — Hong S Cho
(74) *Attorney, Agent, or Firm* — Christopher & Weisberg, P.A.

(57) ABSTRACT

A method, system and apparatus are disclosed. In one or more embodiments, a network node configured to communicate with a wireless device (WD) is provided. The network node is configured to, and/or comprises a radio interface and/or comprises processing circuitry configured to signal switching information for Bandwidth Part (BWP) switching in a search space that is absent scheduling information for data transmission to the wireless device.

12 Claims, 10 Drawing Sheets

BEGIN

Receive switching information for Bandwidth Part (BWP) switching, the signaling being absent of shared channel scheduling information
S144

Perform BWP switching based at least in part on the switching information
S146

END

(56) References Cited

OTHER PUBLICATIONS

3GPP TSG-RAN WG2 #99bis R1-1710217; Title: User plane impacts for Bandwidth Parts; Agenda Item: 10.2.3; Source: Huawei, HiSilicon; Document for: Discussion and decision; Date and Location: Oct. 9-13, 2017, Prague, CZ, consisting of 6-pages.
3GPP TSG RAN WG1 Meeting #91 R1-1720693; Title: Open Issues on BWP; Agenda Item: 7.3.4.1; Source: Qualcomm Incorporated; Document for: Discussion/Decision; Date and Location: Nov. 27-Dec. 1, 2017, Reno, NV, USA, consisting of 15-pages.
3GPP TSG RAN WG2 Meeting #100 R1-1712969; Title: BWP switch on C-DRX; Agenda Item: 10.3.1.10; Source: Potevio; Document for: Discussion and decision; Date and Location: Nov. 27-Dec. 1, 2017, Reno, USA, consisting of 3-pages.
3GPP TSG RAN WG1 Meeting AH 1801 R1-1800879; Title: Remaining Issues on BWP; Agenda Item: 7.3.4.1; Source: Qualcomm Incorporated; Document for: Discussion/Decision; Date and Location: Jan. 22-26, 2018, Vancouver, Canada, consisting of 13-pages.
3GPP TSG RAN WG1 Meeting #93 R1-1806964; Title: Remaining Issues on dynamic BWP switching; Agenda Item: 7.1.3.4.1; Source: InterDigital, Inc.; Document for: Discussion, Decision; Date and Location: May 21-25, 2018, Busan, Korea, consisting of 3-pages.
3GPP TS 36.211 V15.2.0; 3rd Generation Partnership Project; Technical Specification Group Radio Access Network; Evolved Universal Terrestrial Radio Access (E-UTRA); Physical Channels and modulation (Release 15), Jun. 2018, consisting of 236-pages.
3GPP TS 38.213 V15.2.0; 3rd Generation Partnership Project; Technical Specification Group Radio Access Network; NR; Physical layer procedures for control (Release 15), Jun. 2018, consisting of 99-pages.
3GPP TS 38.214 V15.2.0; 3rd Generation Partnership Project; Technical Specification Group Radio Access Network; NR; Physical layer procedures for data (Release 15), Jun. 2018, consisting of 95-pages.
Bgpp Ts 38.212 V15.3.0; 3rd Generation Partnership Project; Technical Specification Group Radio Access Network; NR; Multiplexing and channel coding (Release 15), Sep. 2018, consisting of 99-pages.

\* cited by examiner

EFFICIENT BWP SWITCHING

CROSS-REFERENCE TO RELATED APPLICATIONS

This application is a Submission Under 35 U.S.C. § 371 for U.S. National Stage Patent Application of International Application No.: PCT/EP2019/076060, filed Sep. 26, 2018 entitled "EFFICIENT BWP SWITCHING," which claims priority to U.S. Provisional Application No. 62/738,891, filed Sep. 28, 2018, entitled "BANDWIDTH PART (BWP) SWITCHING," the entireties of both of which are incorporated herein by reference.

TECHNICAL FIELD

The present disclosure relates to wireless communications, and in particular, to signaling and/or receiving switching information for Bandwidth Part (BWP) switching.

BACKGROUND

NR

The New Radio (NR) standard in Third Generation Partnership Projection (3GPP, also referred to as $5^{th}$ Generation (5G)) is being designed to provide service for multiple use cases such as enhanced mobile broadband (eMBB), ultra-reliable and low latency communication (URLLC), and machine type communication (MTC). Each of these services has different technical requirements. FIG. 1 is an example radio resource in NR. For example, the general requirement for eMBB may be high data rate with moderate latency and moderate coverage, while URLLC service may require a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot may consist of any number of 1 to 14 orthogonal frequency-division multiplexing (OFDM) symbols. It should be noted that the concepts of slot and mini-slot are not specific to a specific service meaning that a mini-slot may be used for either eMBB, URLLC, or other services.

Physical Channels

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH:

PDSCH is the main physical channel used for unicast downlink data transmission, but also for transmission of RAR (random access response), certain system information blocks, and paging information. PBCH carries the basic system information, required by the wireless device to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:

Physical Uplink Shared Channel, PUSCH;
Physical Uplink Control Channel, PUCCH; and
Physical Random Access Channel, PRACH.

PUSCH is the uplink counterpart to the PDSCH. PUCCH is used by wireless devices to transmit uplink control information, including HARQ acknowledgments, channel state information reports, etc. PRACH is used for random access preamble transmission.

An example contents of a downlink (DL) DCI 1-0 is shown below.

Example contents of a DCI format 1_0 with CRC scrambled by C-RNTI/CS RNTI

Identifier for DCI formats—1 bit;
  The value of this bit field is always set to 1, indicating a DL DCI format;
Frequency domain resource assignment—$\lceil \log_2(N_{RB}^{DL,BWP}(N_{RB}^{DL,BWP}+1)/2)\rceil$ bits;
  $N_{RB}^{DL,BWP}$ is the size of the active DL bandwidth part in case DCI format 1_0 is monitored in the wireless device specific search space and satisfies:
    the total number of different DCI sizes configured to monitor is no more than 4 for the cell, and
    the total number of different DCI sizes with C-RNTI configured to monitor is no more than 3 for the cell;
  otherwise, $N_{RB}^{DL,BWP}$ is the size of CORESET 0.
Time domain resource assignment—4 bits as defined in wireless communication standards such as Subclause 5.1.2.1 of 3GPP Technical Specification (TS) 38.214, for example;
virtual resource block (VRB)-to-physical resource block (PRB) mapping—1 bit according to Table 7.3.1.1.2-33 of 3GPP TS 38.214, for example;
Modulation and coding scheme—5 bits as defined in Subclause 5.1.3 of 3GPP TS 38.214, for example;
New data indicator—1 bit;
Redundancy version—2 bits as defined in Table 7.3.1.1.1-2 of 3GPP TS 38.214, for example;
HARQ process number—4 bits;
Downlink assignment index—2 bits as defined in wireless communication standards such as Subclause 9.1.3 of 3GPP TS 38.213, for example, as counter DAI;
TPC command for scheduled PUCCH—2 bits as defined in wireless communication standards such as Subclause 7.2.1 of 3GPP TS 38.213, for example;
PUCCH resource indicator—3 bits as defined in wireless communication standards such as Subclause 9.2.3 of TS 38.213, for example;
PDSCH-to-HARQ feedback timing indicator—3 bits as defined in wireless communication standards such as Subclause 9.2.3 of 3GPP TS38.213, for example;

Power Saving

Wireless device power consumption is a metric that is being studied. In general, significant power can be spent on monitoring the PDCCH in LTE based on one DRX setting from LTE field logs. The situation can be similar in NR if similar DRX setting with traffic modeling is utilized, as the wireless device needs to perform blind detection in its configured control resource sets (CORESETs) to identify whether there is a PDCCH sent to it, and act accordingly. Techniques that can reduce unnecessary PDCCH monitoring or allowing wireless device to go to sleep or wake-up only when required can be beneficial.

A wireless device in NR operates in various radio resource control (RRC) modes: RRC_IDLE, RRC_INACTIVE, and RRC_CONNECTED mode. One of the activities for a wireless device in RRC_CONNECTED mode is monitoring the PDCCH for potentially scheduled data on a PDSCH/PUSCH by the network node, where this activity may be one of the main activities performed by the wireless device in RRC_CONNECTED mode.

During this activity, a wireless device may need to receive and decode received data in all PDCCH occasions/Time-Frequency (TF) locations/configurations according to a configured search space. The decoding process, referred to as blind decoding (BD), entails searching for various Downlink Control Information (DCI) commands potentially present on the PDCCH and addressed to the wireless device based on checking the cyclic redundancy check (CRC) using its cell-radio network temporary identifier (c-RNTI).

Connected-DRX (C-DRX) mechanism exists to enable putting the wireless device in a low-power mode for a considerably large fraction of the time when no traffic is transmitted to the wireless device. According to a configured periodicity, the wireless device wakes up to monitor the PDCCH which may or may not include an allocation. The period during which the wireless device is awake and monitoring PDCCH is called On-Duration. If any uplink/downlink (DL/UL) allocation is found during the On-Duration, the wireless device is kept awake for a period of time (Inactivity Timer running) during which it constantly monitors PDCCH. If the wireless device is not allocated any data during this time, the wireless device goes back to discontinuous operation, again waking up occasionally during On-Durations. C-DRX is depicted in FIG. 2.

Typically, the C-DRX parameters are configured by RRC and there are some other DRX parameters including RTT related, HARQ related, etc. On duration and the time duration when inactivity timer is running is also generally referred to as active time.

The following terms are typically associated with C-DRX operation:
  Active Time: Time related to C-DRX operation, during which the MAC entity monitors the PDCCH.
  C-DRX Cycle: Specifies the periodic repetition of the On Duration followed by a possible period of inactivity (as illustrated in FIG. 2).
  Inactivity Timer: Generally, refers to the number of consecutive PDCCH-subframe(s)/slots after the subframe/slot in which a PDCCH indicates an initial UL, DL or SL user data transmission for a MAC entity.

One aspect is that C_DRX functionality is configured by RRC, which is typically operating on a slower scale than MAC or Physical layer. Thus, the C-DRX parameter settings, etc., may not be changed quite adaptively through RRC reconfiguration, especially if the wireless device has a mix of traffic types.

BWP

Bandwidth part (BWP) framework in NR provides a mechanism for the wireless device to operate in different limited frequency regions of the carrier and/or at different bandwidths as illustrated in FIGS. 3a-3d. The wireless device may be configured with up to 4 BWPs but it has one active BWP at the time. The wireless device monitors a certain PDCCH search space, where one of the parameters is the BWP index (0-3) that indicates a BWP where that BWP is the active BWP for the wireless device during PDCCH monitoring. DCI carried by PDCCH for scheduling a PDSCH transmission includes a BWP index for the PDSCH, i.e., the DCI is a scheduling DCI includes a scheduling command that indicates a BWP to switch to for PDSCH.

In particular, scheduling DCIs (DL assignment for DL BWP, UL grant for UL BWP) is used to switch BWP for unpaired spectrum, both DCIs can be used (BWP indicator is only included in DCI 0_1 and 1_1). An optional timer mechanism may be used to switch back to default DL BWP (paired spectrum) or DL/UL BWP pair (unpaired spectrum). A wireless device may not be expected to receive a DCI indicating active DL (UL) BWP change in OFDM symbols other than the first 3 OFDM symbols of a slot. A wireless device may not be expected to receive a DCI indicating active DL (UL) BWP change that violates minimum BWP switching times. A wireless device is not expected to receive DL signals or transmit UL signals during the transition time of active DL or UL BWP switch.

For DCI-based active BWP switch, the transition time of active DL or UL BWP switch is the time duration from the end of a 3rd OFDM symbol (of the slot where the DCI is received) till the beginning of a slot indicated by K0 in the active DL BWP switch DCI or K2 in the active UL BWP switch DCI. K0 is the time offset (in slots) between the DCI command and the allocated data on PDSCH. K2 is the time offset (in slots) between the DCI command and the allocated data on PUSCH.

There is no timer concept for DCI. For timer-based active BWP switch, the transition time of active DL or UL BWP switch is the time duration from the beginning of the subframe (FR1) or half-subframe (FR2) immediately after a BWP timer expires till the beginning of a slot the wireless device is able to receive DL signals or transmit UL signals.

SUMMARY

Some embodiments advantageously provide methods, systems, and apparatuses for signaling and/or receiving switching information for Bandwidth Part (BWP) switching.

The instant disclosure provides for multiple new BWP switching and UL data acknowledgment mechanisms:
  BWP Switching Using Explicit Signaling
  (1) The wireless device receives a DCI carrying only a BWP switching instruction, i.e., switching information, without associated PDSCH/PUSCH scheduling. Potentially transmitted UL data is thereby implicitly acknowledged by the network node.
  (2) The wireless device receives a BWP switching instruction, i.e., switching information, from the MAC control element (MAC CE), which indicates at what time the wireless device may switch to different BWP configuration(s). As in (1), potentially transmitted UL data is thereby implicitly acknowledged by the NW.
  BWP Switching after Completed Data Transmission
  (3) The wireless device is preconfigured to switch to a specified (not necessarily default) BWP immediately after a successfully finished PDSCH reception, or the wireless device can postpone the switch until after the PUCCH transmission. In one or more embodiments herein, successful reception and/or transmission may correspond to receipt and/or transmission of one or more ACKs.
  (4) After an UL transmission (e.g., PUSCH) a wireless device may wait until a timer expires until it switches to a predetermined (not necessarily default) BWP to give the network node a chance to request a retransmission of the UL
  BWP Switching Based on Operational States
  (5) The wireless device is preconfigured to switch to a specified (not necessarily default) BWP based on entering a certain operational state, e.g. when entering C-DRX or sub-states thereof, when entering C-DRX ON period, or when indicated to receive a special service such as ETWS.

The choice of switching modes and signaling modes may be made on a per-wireless device basis and may be adapted to the current wireless device traffic type.

In the existing Bandwidth Part (BWP) management framework, the DCI switching is tied to DCI that schedules a PDSCH/PUSCH (i.e., tied to a scheduling DCI) and the wireless device may switch the BWP in conjunction with PDSCH reception/PUSCH transmission. This may be limiting since there is no mechanism for switching the wireless device to a different BWP without an associated data transmission.

Another side-effect in existing systems of DCIs always entailing scheduling information for upcoming DL/UL data is that a wireless device, after a last transmission (i.e., no more planned DL or UL planned for the wireless device), may not be able to receive an immediate acknowledgment (HARQ-ACK) on the PDCCH and may need to wait for potential retransmission request from the network (NW) or network node.

Some existing systems provide a timer approach for returning the wireless device to its default BWP where the switch is performed a certain time after a finished PDSCH reception/PUSCH transmission. However, awaiting timer expiry may not be desirable in certain situations and the default BWP may not always be the preferred destination BWP to which to switch.

According to one aspect of the disclosure, a network node configured to communicate with a wireless device is provided. The network node includes processing circuitry configured to cause signaling of switching information for Bandwidth Part (BWP) switching, the signaling being absent of shared channel scheduling information.

According to one or more embodiments of this aspect, the switching information is included in downlink control information (DCI). According to one or more embodiments of this aspect, the switching information is a switching instruction in a MAC control element (MAC CE). According to one or more embodiments of this aspect, the switching information is configured to acknowledge previous communication of data. According to one or more embodiments of this aspect, the switching information configures the wireless device for BWP switching based at least in part on one of a predetermined action at the wireless device and operational state of the wireless device.

According to one or more embodiments of this aspect, the signaling of switching information is radio resource control, RRC, signaling. According to one or more embodiments of this aspect, the operational state includes connected-discontinuous reception, C-DRX, or a sub-state of C-DRX. According to one or more embodiments of this aspect, the BWP switching is configured to be triggered by entering the operation state. According to one or more embodiments of this aspect, the predetermination action at the wireless device includes one of: a physical downlink shared channel reception; a physical uplink shared channel transmission; a physical uplink control channel transmission; and an expiration of a timer. According to one or more embodiments of this aspect, the BWP switching includes switching to a narrower BWP than a previous BWP.

According to another aspect of the disclosure, a wireless device configured to communicate with a network node is provided. The wireless device includes processing circuitry configured to: receive switching information for Bandwidth Part (BWP) switching where the signaling being absent of shared channel scheduling information, and perform BWP switching based at least in part on the switching information.

According to one or more embodiments of this aspect, the switching information is included in downlink control information (DCI). According to one or more embodiments of this aspect, the switching information is a switching instruction in a MAC control element (MAC CE). According to one or more embodiments of this aspect, the switching information is configured to acknowledge previous communication of data. According to one or more embodiments of this aspect, the switching information is configured to cause the BWP switching based at least in part on one of a predetermined action at the wireless device and operational state of the wireless device.

According to one or more embodiments of this aspect, the signaling of switching information is radio resource control, RRC, signaling. According to one or more embodiments of this aspect, the operational state includes connected-discontinuous reception, C-DRX, or a sub-state of C-DRX. According to one or more embodiments of this aspect, the BWP switching is configured to be triggered by entering the operation state. According to one or more embodiments of this aspect, the predetermination action at the wireless device includes one of: a physical downlink shared channel reception; a physical uplink shared channel transmission; a physical uplink control channel transmission; and an expiration of a timer. According to one or more embodiments of this aspect, the BWP switching includes switching a narrower BWP than a previous BWP.

According to another aspect of the disclosure, a method implemented by a network node that is configured to communicate with a wireless device is provided. Signaling of switching information for Bandwidth Part (BWP) switching is caused where the signaling is absent of shared channel scheduling information.

According to one or more embodiments of this aspect, the switching information is included in downlink control information (DCI). According to one or more embodiments of this aspect, the switching information is a switching instruction in a MAC control element (MAC CE). According to one or more embodiments of this aspect, the switching information is configured to acknowledge previous communication of data. According to one or more embodiments of this aspect, the switching information configures the wireless device for BWP switching based at least in part on one of a predetermined action at the wireless device and operational state of the wireless device.

According to one or more embodiments of this aspect, the signaling of switching information is radio resource control, RRC, signaling. According to one or more embodiments of this aspect, the operational state includes connected-discontinuous reception, C-DRX, or a sub-state of C-DRX. According to one or more embodiments of this aspect, the BWP switching is configured to be triggered by entering the operation state. According to one or more embodiments of this aspect, the predetermination action at the wireless device includes one of: a physical downlink shared channel reception; a physical uplink shared channel transmission; a physical uplink control channel transmission; and an expiration of a timer. According to one or more embodiments of this aspect, the BWP switching includes switching to a narrower BWP than a previous BWP.

According to another aspect of the disclosure, a method implemented by a wireless device that is configured to communicate with a network node is provided. Switching information for Bandwidth Part (BWP) switching is received where the signaling being absent of shared channel scheduling information. BWP switching is performed based at least in part on the switching information.

According to one or more embodiments of this aspect, the switching information is included in downlink control information (DCI). According to one or more embodiments of this aspect, the switching information is a switching instruction in a MAC control element (MAC CE). According to one or more embodiments of this aspect, the switching information is configured to acknowledge previous communication of data. According to one or more embodiments of this aspect, the switching information is configured to cause the BWP switching based at least in part on one of a predetermined action at the wireless device and operational state of the wireless device.

According to one or more embodiments of this aspect, the signaling of switching information is radio resource control, RRC, signaling. According to one or more embodiments of this aspect, the operational state includes connected-discontinuous reception, C-DRX, or a sub-state of C-DRX. According to one or more embodiments of this aspect, the BWP switching is configured to be triggered by entering the operation state. According to one or more embodiments of this aspect, the predetermination action at the wireless device includes one of: a physical downlink shared channel reception; a physical uplink shared channel transmission; a physical uplink control channel transmission; and an expiration of a timer. According to one or more embodiments of this aspect, the BWP switching includes switching a narrower BWP than a previous BWP.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
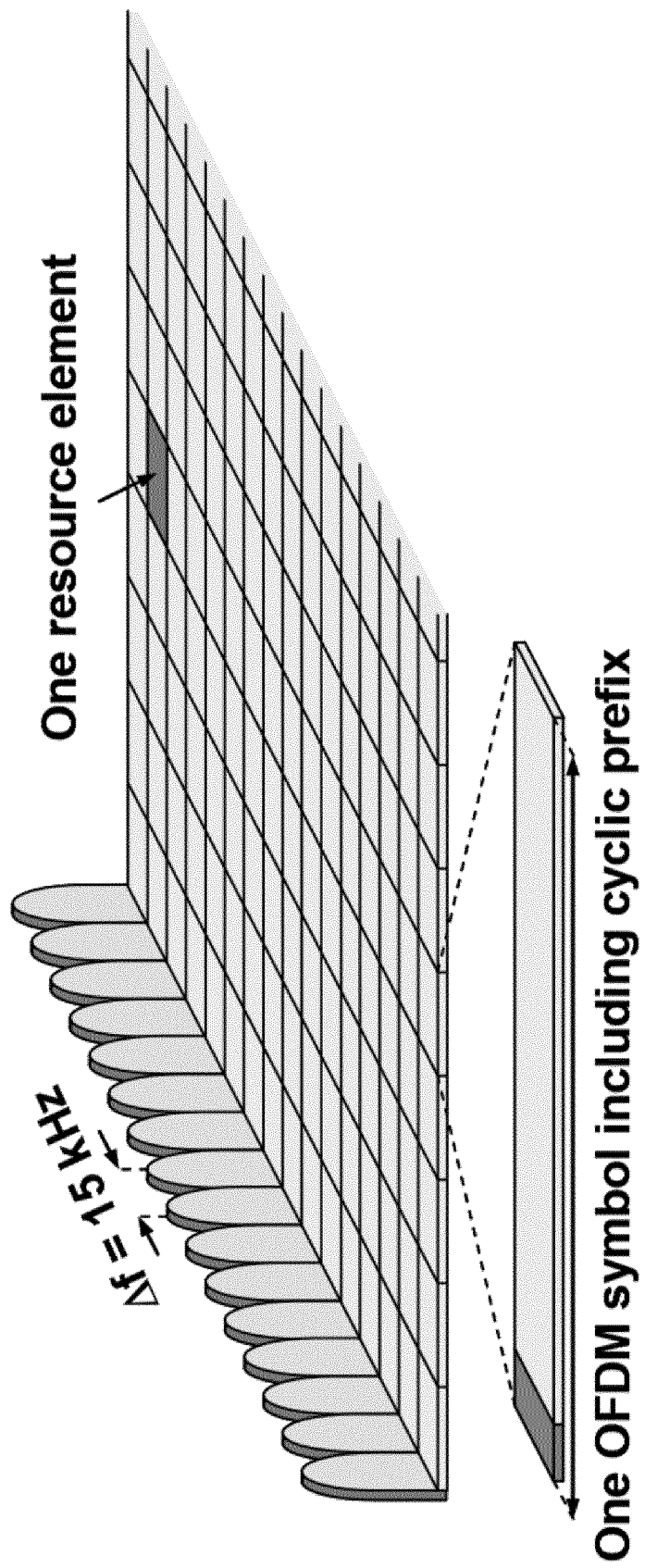
FIG. 1 is a diagram of an example radio resource in NR.
Figure 2:
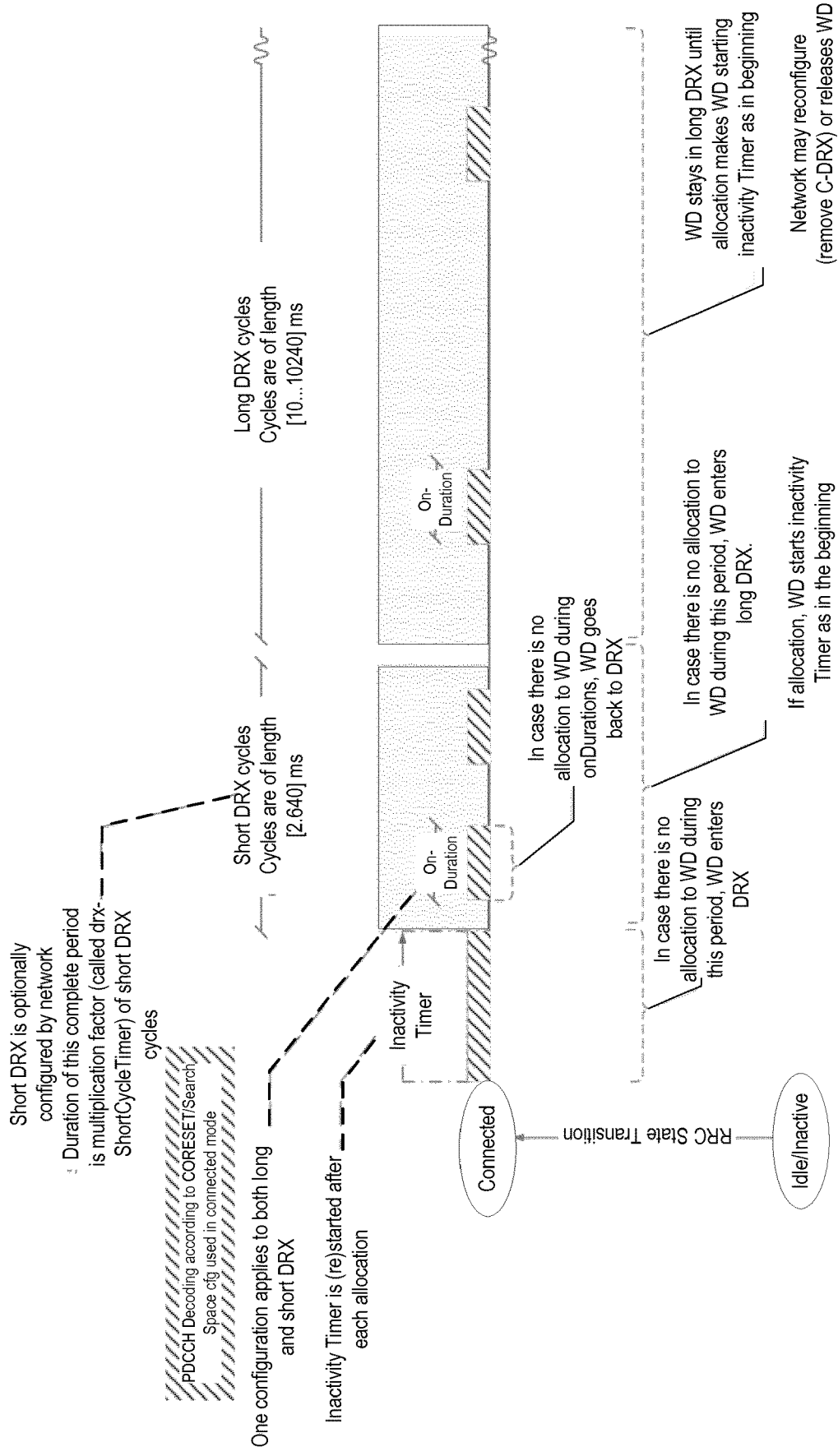
FIG. 2 is a diagram of a connected-DRX operation in existing systems.
Figure 3B:
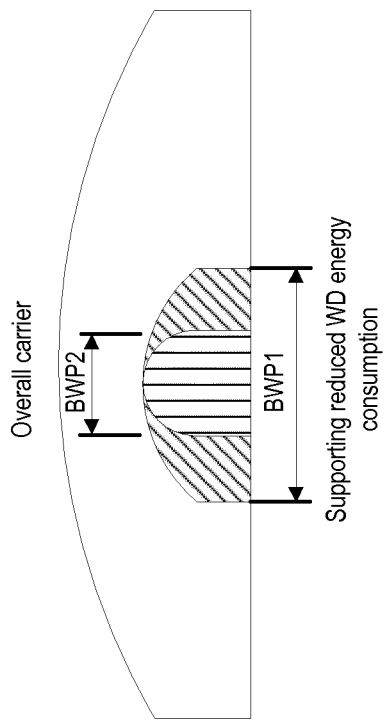
FIGS. 3a-3d are diagrams of various BWP framework mechanisms in NR.
Figure 3D:
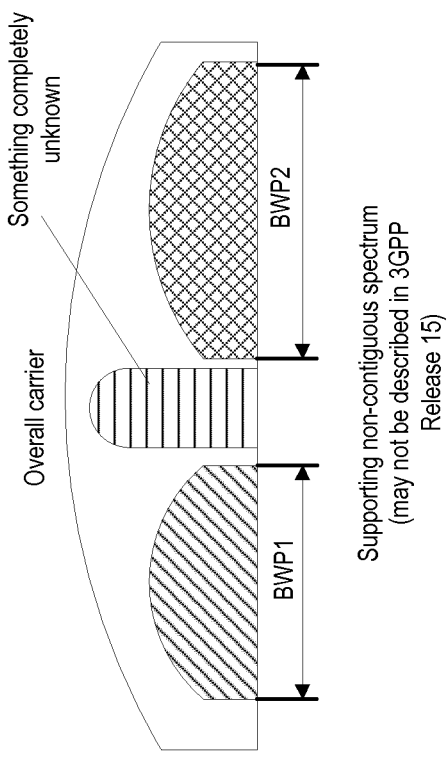
Figure 3A:
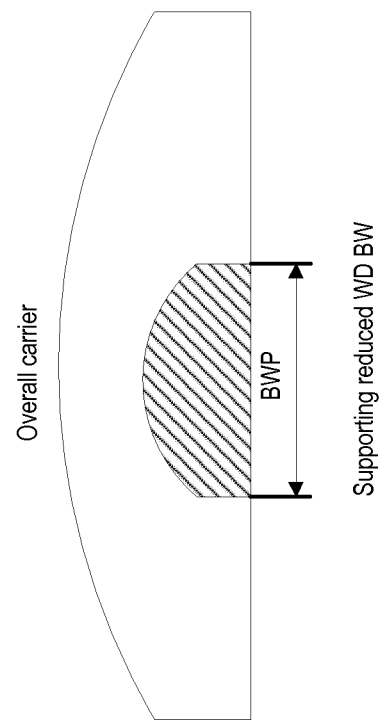
Figure 3C:
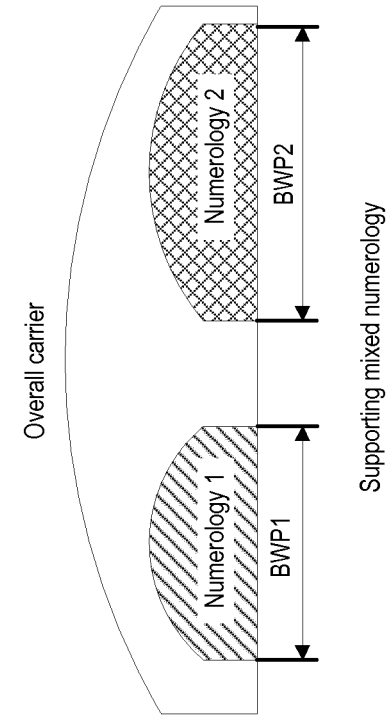

The instant disclosure provides arrangements for BWP switching that can be used at an arbitrary time and with minimal overhead and are not tied to other traffic scheduling patterns.

The instant disclosure solves at least a portion of at least a part of the problems with existing systems by providing at least one mechanism for BWP switching that may require lightweight or no signaling and is not rigidly tied to PDSCH scheduling, and provides flexibility for specifying the destination BWP other than the default BWP. Furthermore, the at least one mechanism provides for the wireless device to avoid PDCCH monitoring after a last transmitted uplink (UL) (from WD to network node) data for potential retransmission request.

Before describing in detail exemplary embodiments, it is noted that the embodiments reside primarily in combinations of apparatus components and processing steps related to signaling and/or receiving switching information for Bandwidth Part (BWP) switching.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g., WD) may comprise configuring the WD to perform BWP switching as described herein.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE and/or NR technologies. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP, NR and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data/information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for signaling and/or receiving switching information for Bandwidth Part (BWP) switching. As used herein, switching information generally refers to information that is to facilitate BWP switching, where the teachings of the disclosure describe one or more embodiments of the switching information that may be related to each other and/or unrelated to each other.

Figure 4:
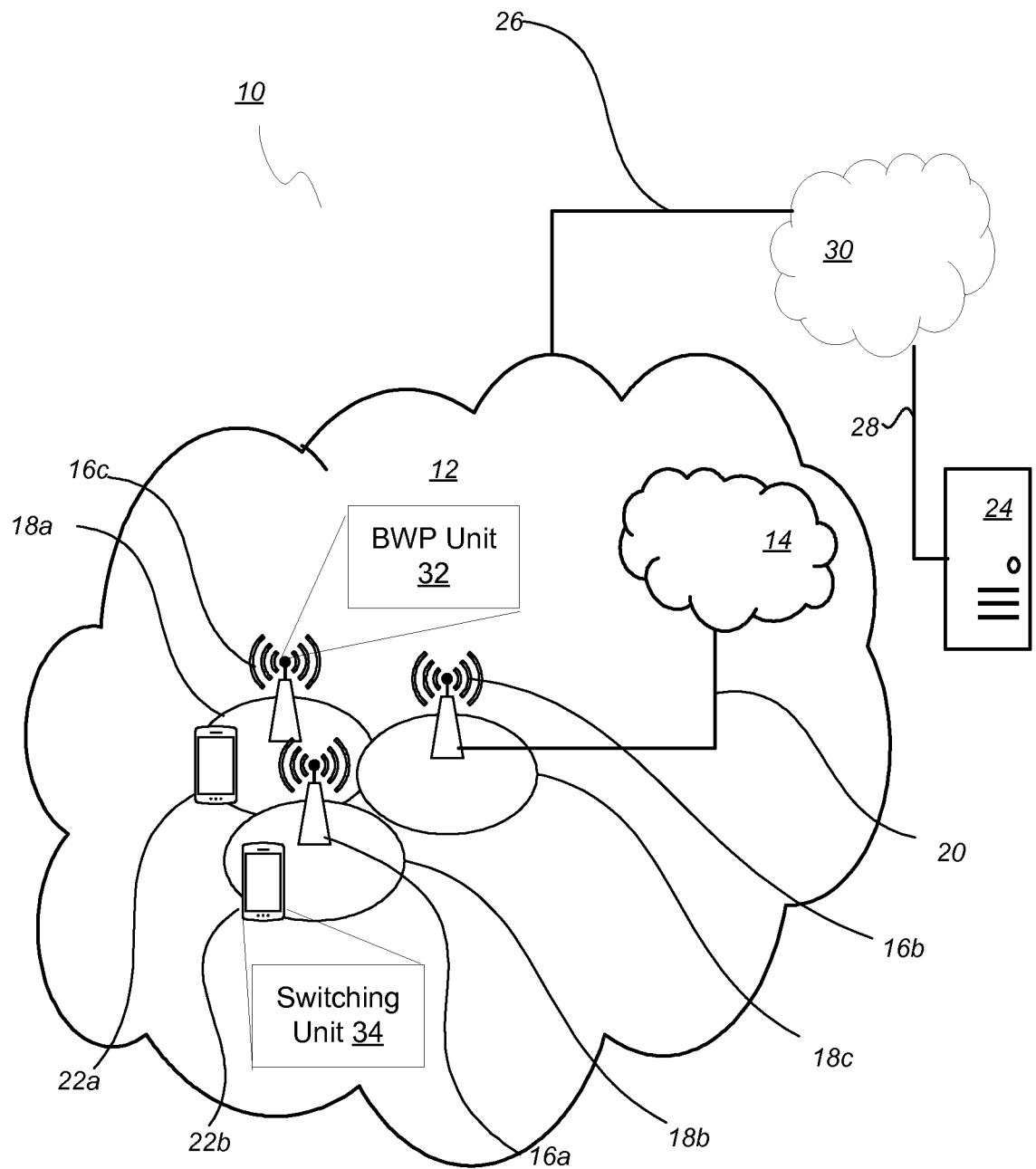
FIG. 4 is a schematic diagram of an exemplary network architecture illustrating a communication system connected via an intermediate network to a host computer according to the principles in the present disclosure.

Referring back to the figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a BWP unit 32 which is configured to cause signaling and/or signal switching information for Bandwidth Part (BWP) switching, as described herein. A wireless device 22 is configured to include a switching unit 34 which is configured to perform BWP switching based on switching information, as described herein.

Example implementations, in accordance with an embodiment, of the WD 22, network node 16 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide information related to switching information described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include BWP unit 32 configured to perform one or more network node 16 functions as described herein such as with respect to causing signaling and/or signaling switching information for BWP switching.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a switching unit 34 configured to perform one or more wireless device 22 functions described herein such as with respect to BWP switching based on switching information.

Figure 5:
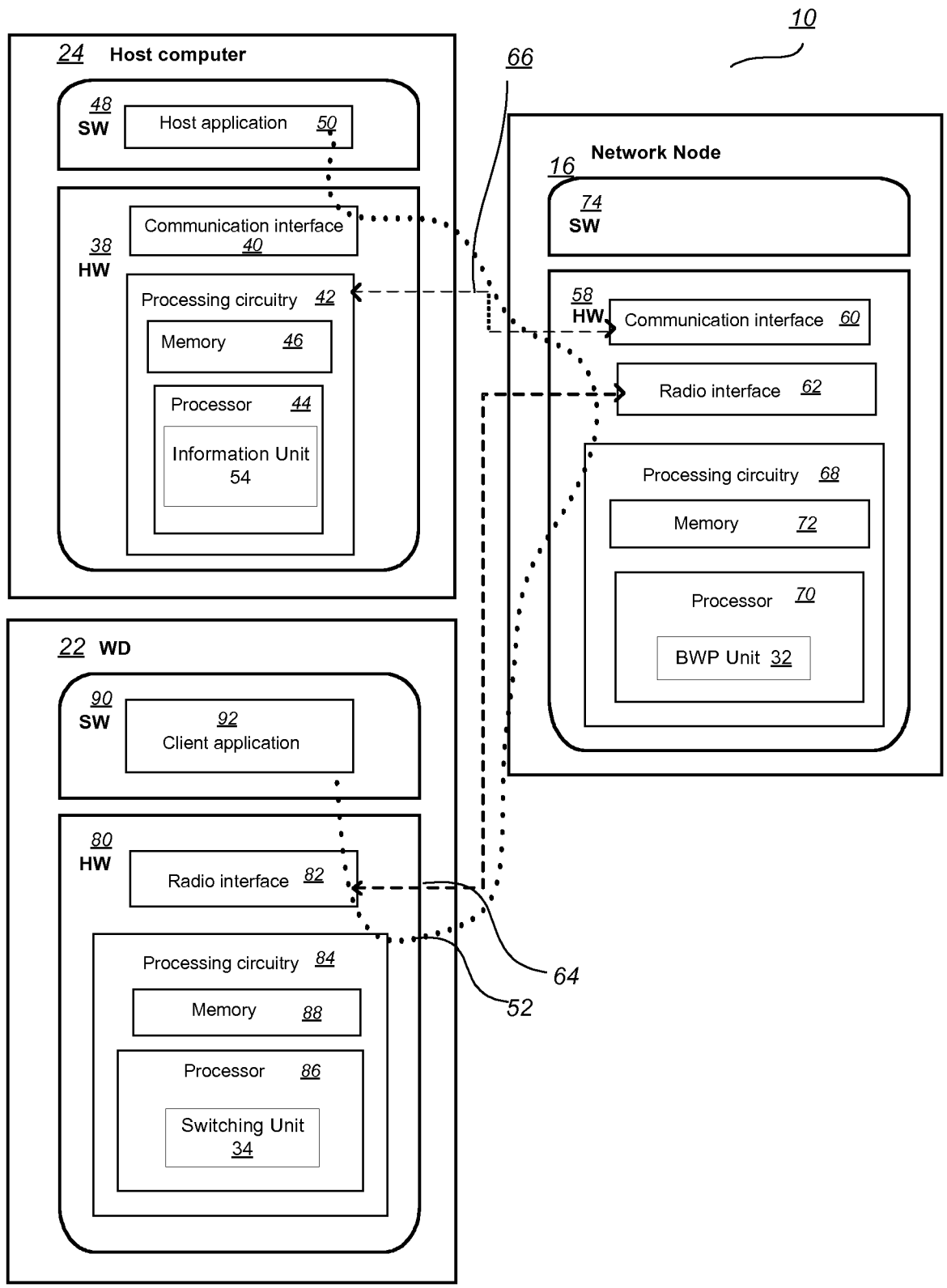
FIG. 5 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 5 and independently, the surrounding network topology may be that of FIG. 4.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as BWP unit 32, and switching unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 6, 7:
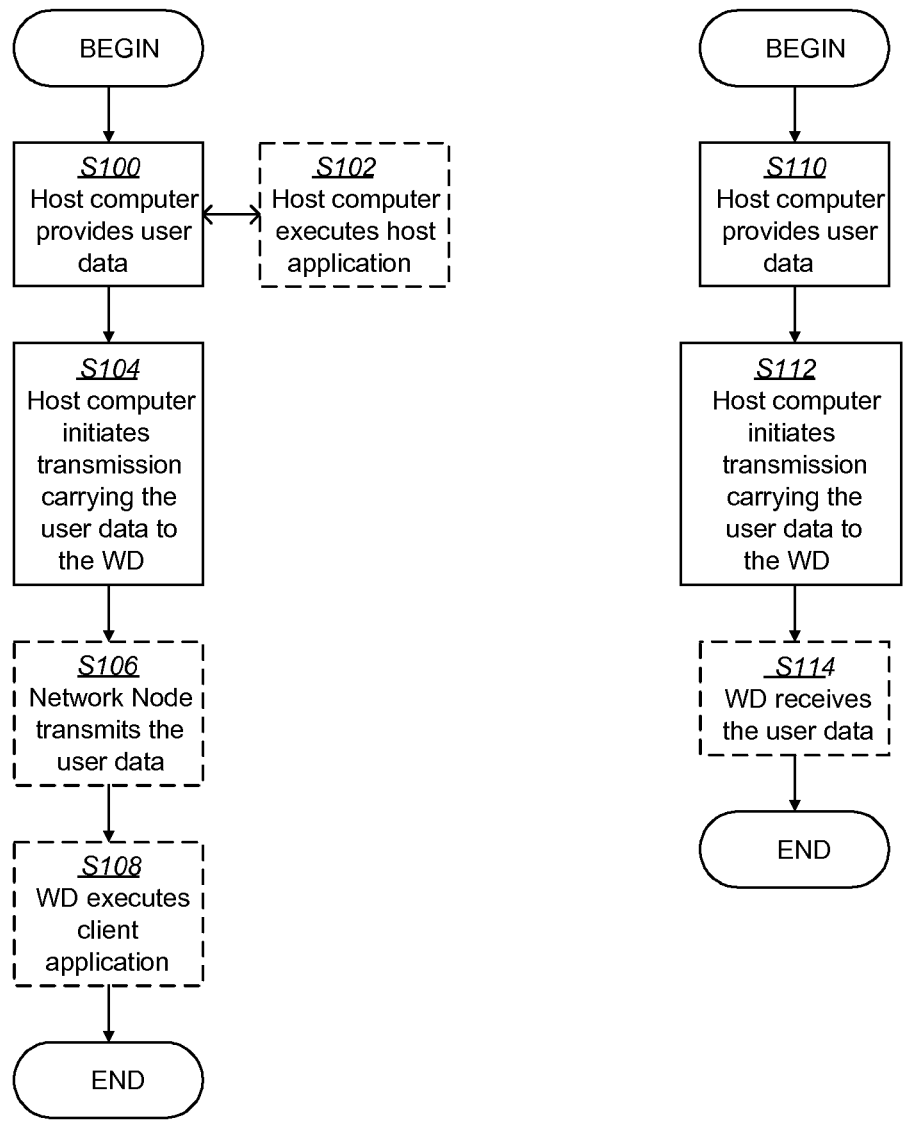
FIG. 6 is a flow chart illustrating exemplary methods implemented in a communication system including a host computer, a network node and a wireless device for executing a client application at a wireless device according to some embodiments of the present disclosure.
FIG. 7 is a flow chart illustrating exemplary methods implemented in a communication system including a host computer, a network node and a wireless device for receiving user data at a wireless device according to some embodiments of the present disclosure.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
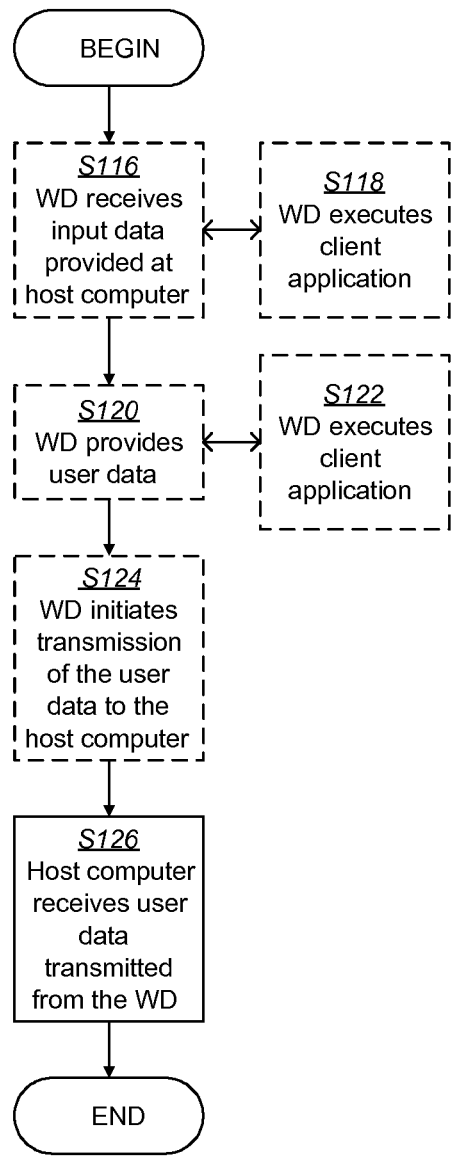
FIG. 8 is a flow chart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
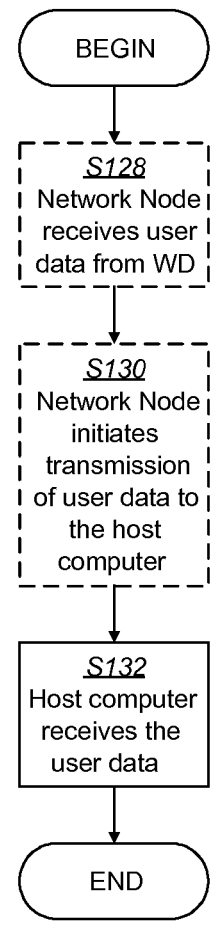
FIG. 9 is a flow chart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
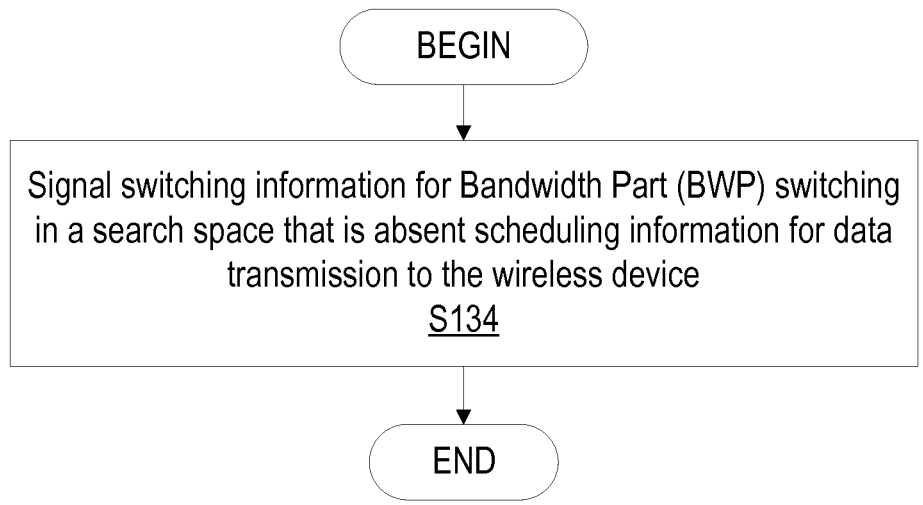
FIG. 10 is a flowchart of an exemplary process in a network node for signaling switching information according to some embodiments of the present disclosure.

FIG. 10 is a flowchart of an exemplary process of BWP unit 32 in a network node 16 for signaling switching information in accordance with the principles of the disclosure. One or more Blocks described herein may be performed by one or more elements of network node 16 such as by processing circuitry 68, radio interface 62, communication interface 60, BWP unit 32, etc. Network node 16 such as for example via one or more of processing circuitry 68, radio interface 62, communication interface 60, BWP unit 32, etc. is configured to signal (Block S134) switching information for Bandwidth Part (BWP) switching in a search space that is absent scheduling information for data transmission to the wireless device.

In one or more embodiments, the switching information is included in downlink control information (DCI) that is absent scheduling information for a physical downlink shared channel (PDSCH) and physical uplink shared channel (PUSCH) where the switching information configured to implicitly acknowledge potentially transmitted uplink data. In one or more embodiments, the switching information is a switching instruction in a MAC control element (MAC CE) where the switching information configured to implicitly acknowledge potentially transmitted uplink data.

Figure 11:
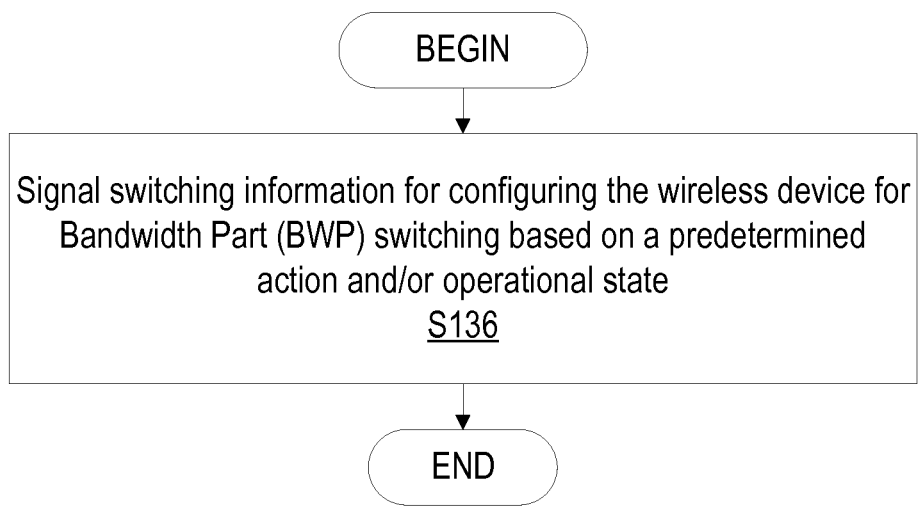
FIG. 11 is a flowchart of another exemplary process in a network node for signaling switching information according to some embodiments of the present disclosure.

FIG. 11 is a flowchart of another exemplary process of BWP unit 32 in a network node 16 for signaling switching information in accordance with the principles of the disclosure. One or more Blocks described herein may be performed by one or more elements of network node 16 such as by processing circuitry 68, radio interface 62, communication interface 60, BWP unit 32, etc. Network node 16 such as for example via one or more of processing circuitry 68, radio interface 62, communication interface 60, BWP unit 32, etc. is configured to signal (Block S136) switching information for configuring the wireless device for Bandwidth Part (BWP) switching based on a predetermined action and/or operational state.

In one or more embodiments, the predetermination action includes physical downlink shared channel reception by the wireless device 22 or physical uplink shared channel transmission by the wireless device 22. In one or more embodiments, the operational state includes connected-discontinuous reception (DRX) (C-DRX) or a sub-state of C-DRX.

Figure 12:
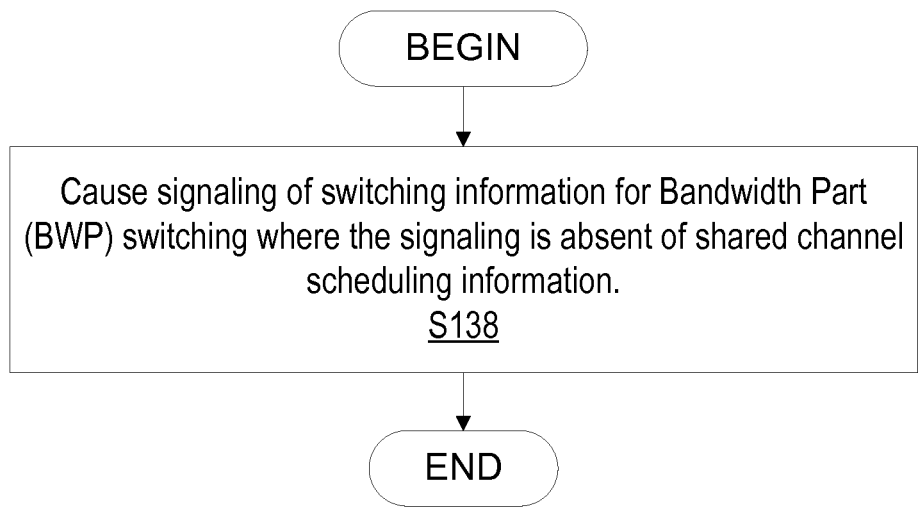
FIG. 12 is a flowchart of another exemplary process in a network node according to one or more embodiments of the present disclosure.

FIG. 12 is a flowchart of an exemplary process implemented by a network node 16 according to one or more embodiments of the disclosure. One or more Blocks described herein may be performed by one or more elements of network node 16 such as by processing circuitry 68, radio interface 62, communication interface 60, BWP unit 32, etc. Network node 16 such as via one or more of processing circuitry 68, radio interface 62, communication interface 60, BWP unit 32, etc. is configured to cause (Block S138) signaling of switching information for Bandwidth Part (BWP) switching, the signaling being absent of shared channel scheduling information.

According to one or more embodiments, the switching information is included in downlink control information (DCI). According to one or more embodiments, the switching information is a switching instruction in a MAC control element (MAC CE). According to one or more embodiments, the switching information is configured to acknowledge previous communication of data. According to one or more embodiments, the switching information configures the wireless device 22 for BWP switching based at least in part on one of a predetermined action at the wireless device 22 and operational state of the wireless device 22.

According to one or more embodiments, the signaling of switching information is radio resource control, RRC, signaling. According to one or more embodiments, the operational state includes connected-discontinuous reception, C-DRX, or a sub-state of C-DRX. According to one or more embodiments, the BWP switching is configured to be triggered by entering the operation state. According to one or more embodiments, the predetermination action at the wireless device includes one of: a physical downlink shared channel reception; a physical uplink shared channel transmission; a physical uplink control channel transmission; and an expiration of a timer. According to one or more embodiments, the BWP switching includes switching a narrower BWP than a previous BWP.

Figure 13:
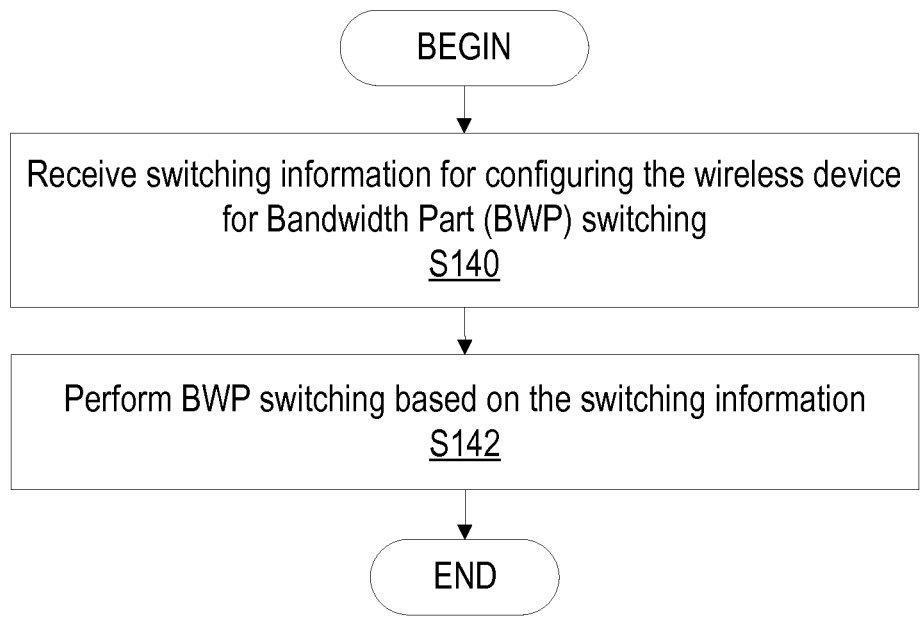
FIG. 13 is a flowchart of an exemplary process in a wireless device for performing BWP switching according to some embodiments of the present disclosure.

FIG. 13 is a flowchart of an exemplary process of switching unit 34 in a wireless device 22 according to some embodiments of the present disclosure. One or more Blocks described herein may be performed by one or more elements of WD 22 such as by processing circuitry 84, radio interface 82, switching unit 34, etc. WD 22 such as via one or more of processing circuitry 84, switching unit 34, radio interface 82, etc. is configured to receive (Block S140) switching information for configuring the wireless device for Bandwidth Part (BWP) switching. WD 22 such as via one or more of processing circuitry 84, switching unit 34, radio interface 82, etc. is configured to perform (Block S142) BWP switching based on the switching information.

In one or more embodiments, the switch information is based on a predetermined action and/or operational state. In one or more embodiments, the switching information is in a search space that is absent scheduling information for data transmission to the wireless device.

Figure 14:
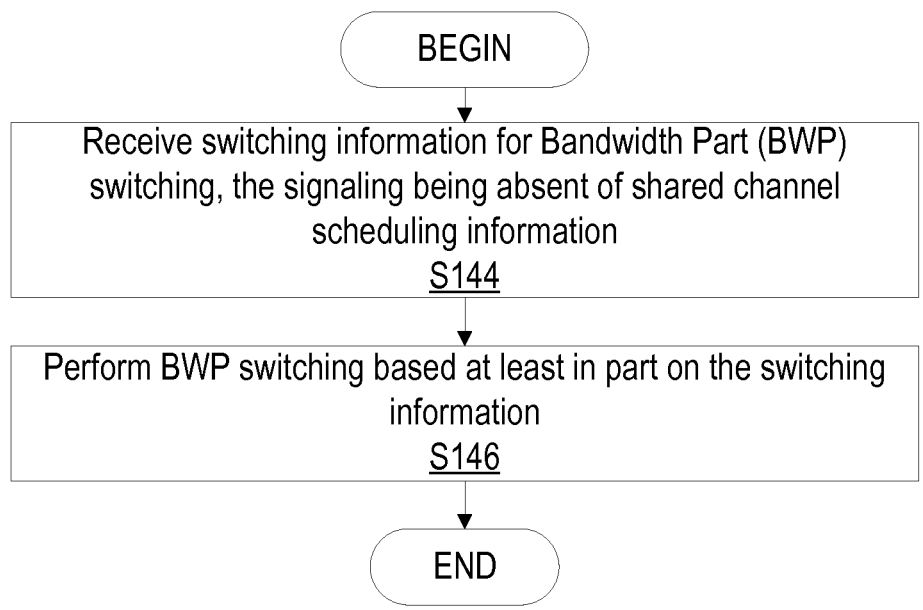
FIG. 14 is a flowchart of another exemplary process in a wireless device according to some embodiments of the present disclosure.

FIG. 14 is a flowchart of another exemplary process implemented by wireless device 22 according to some embodiments of the present disclosure. One or more Blocks described herein may be performed by one or more elements of WD 22 such as by processing circuitry 84, switching unit 34, radio interface 82, etc. WD 22 such as via one or more of processing circuitry 84, switching unit 34, radio interface 82, etc. is configured to receive (Block S144) switching information for Bandwidth Part (BWP) switching where the signaling is absent of shared channel scheduling information, as described herein. WD 22 such as via one or more of processing circuitry 84, switching unit 34, radio interface 82, etc. is configured to perform (Block S146) BWP switching based at least in part on the switching information, as described herein.

According to one or more embodiments, the switching information is included in downlink control information (DCI). According to one or more embodiments, the switching information is a switching instruction in a MAC control element (MAC CE). According to one or more embodiments, the switching information is configured to acknowledge previous communication of data. According to one or more embodiments, the switching information is configured to cause the BWP switching based at least in part on one of a predetermined action at the wireless device 22 and operational state of the wireless device 22.

According to one or more embodiments, the signaling of switching information is radio resource control, RRC, signaling. According to one or more embodiments, the operational state includes connected-discontinuous reception, C-DRX, or a sub-state of C-DRX. According to one or more embodiments, the BWP switching is configured to be triggered by entering the operation state. According to one or more embodiments, the predetermination action at the wireless device includes one of: a physical downlink shared channel reception; a physical uplink shared channel transmission; a physical uplink control channel transmission; and an expiration of a timer. According to one or more embodiments, the BWP switching includes switching a narrower BWP than a previous BWP.

Having generally described arrangements for signaling and/or receiving switching information for Bandwidth Part (BWP) switching, details for these arrangements, functions and processes are provided as follows, and which may be implemented by the network node 16, wireless device 22 and/or host computer 24.

Embodiments provide for signaling of and/or receiving signaling of switching information for Bandwidth Part (BWP) switching. Switching information generally refers to information described herein that facilitates BWP switching, where the teachings of the disclosure describe one or more embodiments of the switching information that may be related to each other and/or unrelated to each other.

Modes of BWP Switching

BWP Switching Using Explicit Signaling (1) The WD 22 may receive a DCI carrying only a BWP switching instruction (e.g., switching information) without associated PDSCH/PUSCH scheduling. Potentially transmitted UL data is thereby implicitly acknowledged by the network, such as from network node 16.

Optionally includes an indicator that the BWP-inactivity timer may be overridden (either ignored or another timer value indicated either in the DCI, e.g., by a factor or RRC configured and selected by DCI) until further BWP directives are given to the WD 22.

(2) WD 22 may receive a BWP switching instruction (e.g., switching information) from the MAC control element (MAC CE), which indicates at what time the WD 22 may switch to different BWP configuration(s). The DL and UL can be changed separately or at the same time. The WD 22 either acknowledges this BWP switching instruction explicitly in the MAC level, or implicitly by sending, e.g., ACK/NACK in the PHY control channels. As in (1), potentially transmitted UL data is thereby implicitly acknowledged by the NW and/or network node 16.

BWP Switching after Data Transmission which May be a Predefined Event or Action (Configuration/Preconfiguration Using Switching Information)

(3) WD 22 may be preconfigured (e.g., by switching information that may be part of an earlier RRC configuration) to switch to a specified (not necessarily default) BWP immediately after a successfully finished PDSCH reception.

a. In a related variant, in case the PDSCH reception is unsuccessful, the WD 22 may wait a maximum of a preconfigured time (specified in seconds or slots), until WD 22 switches to the specified BWP anyway. This may provide room for a limited number of retransmissions from the network node 16. The network node 16 might know that WD 22 anyway may only use a limited number of retransmissions (due to, e.g., latency constraints, or MCS choice), and then the WD 22 may not stay on the more "expensive" PDSCH BWP longer than necessary.

b. A variant of a) above, where the WD 22 waits a maximum of a preconfigured number of retransmissions, before switching to the specified BWP.

In a related variant, the WD can postpone the switch until after the PUCCH transmission is complete. This may be especially useful for unpaired spectrum where the UL and DL BWP are paired (at least, if the new BWP would have a different center frequency).

Therefore, in one or more embodiments, one or more transmissions are one or more predefined events and/or actions that may at least in part trigger BWP switching where such as configuration is indicated in the switching information. RRC signaling of a RRC configuration may not include any scheduling information such that RRC signaling may be absent of shared channel scheduling information.

(4) After an UL transmission (e.g., PUSCH) a WD 22 may wait until a timer expires until WD 22 switches to a predetermined (not necessarily default) BWP. This timer may be configured via RRC signaling described herein. This timer may give the NW or network node 16 a chance to requests a retransmission of the UL if the initial transmission was not successful. This timer may need to be smaller than the BWP timer to switch to a default BWP. Optionally: Instead of switching to another predetermined BWP, WD 22 may move to other power savings modes.

BWP Switching Based on Operational States which May be Predefined Event(s)/Action(s) (Configuration/Preconfiguration Using Switching Information)

(5) WD 22 may be preconfigured (e.g., by switching information as part of RRC configuration) to switch to a specified (not necessarily default) BWP based on entering a certain operational state, e.g.:
  (a) when entering C-DRX or sub-states thereof (e.g., separate configuration for during short DRX vs long DRX periods).
  (b) When entering C-DRX ON period.
  (c) When indicated to receive a special service such as ETWS.

In one or more embodiments, the BWP switching may be based at least in part on a type of DRX cycle. For example, if the wireless device 22 is entering a short DRX cycle, the wireless device 22 may be configured to use an existing BWP or to switch to a different BWP that may be better suited for the short DRX cycle. In another example, if the wireless device 22 is entering a long DRX cycle, the wireless device 22 may be configured to using an existing BWP or to switch to a different BWP that may be better suited for the long DRX cycle. In other words, BWP switching may be based at least in part on one or more characteristics of the operational state.

In one or more embodiments, one or more operational states are one or more predefined events and/or actions that may at least in part trigger BWP switching where such as configuration is indicated in the switching information. As used herein, RRC signaling of a RRC configuration may not include any scheduling information such that RRC signaling may be absent of shared channel scheduling information.

Optionally: A WD 22 may ignore/override potential switching to back to a default BWP in case a BWP-inactivity timer is configured. WD 22 may then leave the BWP when commanded by the NW or a new operational state may require the WD 22 to change BWP.

DCI Format for BWP Switch Signaling

In one aspect of the instant disclosure, a new DCI format can be created for BWP switching and/or UL data HARQ acknowledgment.

In another aspect of the instant disclosure, DCIs (e.g., 1_0, 1_1, 0_0, 0_1) could be used where the resource allocation fields indicate 0 resources. Therefore, no resource on PDSCH is allocated to the WD 22, but the WD 22 can apply the BWP switching as indicated in the DCI, i.e., switching information. The DCI can also allocate resources for the WD 22 to send an acknowledgement that WD 22 receives the DCI and applies the BWP switching accordingly. The feedback related field in the DCI may still be present in the UL PUCCH, e.g., the following fields may still be present, TPC command for scheduled PUCCH, PUCCH resource indicator, and some kind of feedback timing indicator.

The 0_1, 0_0 DCI formats can be used for acknowledgment on the last transmitted UL (as there is no explicit BWP indicator in x_0 formats). However, these can be used in combination with automatic operational state changes mentioned in previous chapter.

The x_1 formats on the other hand may be used to give specific directives on which BWP the WD 22 may change too.

Note that indicating 0 resources could either imply that actually 0 PRBs is used in deriving the resource allocation fields, or any other predefined value is used in the DCIs.

In an alternative embodiment, an existing DCI format (e.g., 1-0) may be reused, but all or a subset of its fields may be ignored or reallocated for BWP switching-related information, e.g., target BWP index, timer settings, etc.

Furthermore, the MAC control element (MAC CE) may also be used to change the BWP configurations. The BWP configurations for DL and UL can be changed at the same time via MAC CE, or independently.

Additional Aspects

The teachings of the instant disclosure can be carried out with the help of several supporting mechanisms. For the UL DCI with 0 PRB allocation but with BWP switching indicated, the WD 22 may expect feedback from the network node 16 first before applying the BWP updates. The feedback can be either sent via DCI, or via a specific channel/signal.

The decision of the BWP switching in the UL can be assisted by the WD 22, i.e., the WD 22 can indicate its buffer status. If the indicated buffer status is small for a consecutive time, this may indicate the WD 22 traffic is now bursty with small data packages. The network node 16 can then configure the UL to a smaller bandwidth. The WD 22 may also indicate what is its preferred bandwidth in this case (e.g., optimal from WD 22 power consumption point view) to assist the network node 16 to make the decision. In other words, the WD 22 may provide assistance to the network node 16 in configuring the BWP switching that the wireless device 22 may implement, as described herein.

For the DL, as the network node 16 may have knowledge of the DL buffer status, the network node 16 can configure the WD 22 accordingly. The WD 22 may still indicate what its preferred bandwidth in this case (e.g., optimal from WD power consumption point view) to assist the network node 16 in making the decision.

BWP switching can also be associated with the WD 22 buffer status. If the network node 16 realizes that the WD BSR reports a relatively small buffer size, the network node 16 can configure the WD 22 to a smaller bandwidth in the UL, and the same applies for the DL.

Robustness of BWP Switching Signaling

It is noted that using DCI-based signaling (e.g., including switching information) can affect robustness, as there is no feedback from the WD 22. There can be a risk that the network node 16 becomes misaligned with the WD 22 regarding the BWP state bookkeeping. (When the BWP switching is performed using PDSCH and PUSCH, there may always be ACK/NACK involved and the network node 16 is aware of any errors.)

In this respect, signaling BWP switching at the MAC CE level may be more robust. There are more bits in MAC CE, so by using MAC CE, the NW or network node 16 can configure the UL and DL at the same time, obviating the need for two DCIs.

However, the associated signaling overhead of the additional bits may significantly increase. Therefore, the NW or network node 16 may choose a signaling mode that provides the desired tradeoff between the amount of signaling and robustness. The selection may be made on a per-UE basis and may be adapted to the current WD traffic type.

In one embodiment, a possible WD/NW misalignment in assumed BWP may be resolved by the NW or network node 16 transmitting control signaling in an alternative BWP after a predetermined number of transmissions in the assumed BWP have not been successful. The assumed BWP here is the BWP that the WD 22 may be used according to the NW's or network node 16's bookkeeping, and the alternative BWP is the previous BWP state of the WD 22 (that the WD 22 likely has not left due to not receiving the switching command).

SOME EXAMPLES

Example A1. A network node 16 configured to communicate with a wireless device 22 (WD 22), the network node 16 configured to, and/or comprising a radio interface 62 and/or comprising processing circuitry 68 configured to signal switching information for Bandwidth Part (BWP) switching in a search space that is absent scheduling information for data transmission to the wireless device 22.

Example A2. The network node 16 of Example A1, wherein the switching information is included in downlink control information (DCI) that is absent scheduling information for a physical downlink shared channel (PDSCH) and physical uplink shared channel (PUSCH), the switching information configured to implicitly acknowledge potentially transmitted uplink data.

Example A3. The network node 16 of Example A1, wherein the switching information is a switching instruction in a MAC control element (MAC CE), the switching information configured to implicitly acknowledge potentially transmitted uplink data.

Example B1. A method implemented in a network node 16, the method comprising signaling switching information for Bandwidth Part (BWP) switching in a search space that is absent scheduling information for data transmission to the wireless device 22.

Example B2. The method of Example B1, wherein the switching information is included in downlink control information (DCI) that is absent scheduling information for a physical downlink shared channel (PDSCH) and physical uplink shared channel (PUSCH), the switching information configured to implicitly acknowledge potentially transmitted uplink data.

Example B3. The method of Example B1, wherein the switching information is a switching instruction in a MAC control element (MAC CE), the switching information configured to implicitly acknowledge potentially transmitted uplink data.

Example C1. A wireless device 22 (WD 22) configured to communicate with a network node 16, the WD 22 configured to, and/or comprising a radio interface 82 and/or processing circuitry 84 configured to:

receive switching information for configuring the wireless device 22 for Bandwidth Part (BWP) switching; and perform BWP switching based on the switching information.

Example C2. The WD 22 of Example C1, wherein the switch information is based on a predetermined action and/or operational state.

Example C3. The WD 22 of Example C1, wherein the switching information is in a search space that is absent scheduling information for data transmission to the wireless device 22.

Example D1. A method implemented in a wireless device 22 (WD 22), the method comprising:

receiving switching information for configuring the wireless device 22 for Bandwidth Part (BWP) switching; and performing BWP switching based on the switching information.

Example D2. The method of Example D1, wherein the switch information is based on a predetermined action and/or operational state.

Example D3. The method of Example D1, wherein the switching information is in a search space that is absent scheduling information for data transmission to the wireless device.

Example E1. A network node 16 configured to communicate with a wireless device 22 (WD 22), the network node configured to, and/or comprising a radio interface and/or comprising processing circuitry 68 configured to signal switching information for configuring the wireless device 22 for Bandwidth Part (BWP) switching based on a predetermined action and/or operational state.

Example E2. The network node 16 of Example E1, wherein the predetermination action includes physical downlink shared channel reception by the wireless device 22 or physical uplink shared channel transmission by the wireless device 22.

Example E3. The network node 16 of Example E1, wherein the operational state includes connected-discontinuous reception (DRX) (C-DRX) or a sub-state of C-DRX.

Example F1. A method implemented in a network node, the method comprising signaling switching information for configuring the wireless device 22 for Bandwidth Part (BWP) switching based on a predetermined action and/or operational state.

Example F2. The method of Example F1, wherein the predetermination action includes physical downlink shared channel reception by the wireless device 22 or physical uplink shared channel transmission by the wireless device 22.

Example F3. The method of Example F1, wherein the operational state includes connected-discontinuous reception (DRX) (C-DRX) or a sub-state of C-DRX.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
Abbreviation Explanation
3GPP 3rd Generation Partnership Project
5G 5th Generation
BB Baseband
BW Bandwidth
C-DRX/CDRX Connected mode DRX (i.e. DRX in RRC_CONNECTED state)
CRC Cyclic Redundancy Check
DCI Downlink Control Information
DL Downlink
DRX Discontinuous Reception
gNB A radio base station in 5G/NR.
HARQ Hybrid Automatic Repeat Request
IoT Internet of Things
LO Local Oscillator
LTE Long Term Evolution
MAC Medium Access Control
MCS Modulation and Coding Scheme
mMTC massive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device, the network node comprising:
processing circuitry configured to cause signaling of switching information for Bandwidth Part (BWP) switching to the wireless device, the signaling of switching information being absent of shared channel scheduling information, and the signaling of switching information pre-configuring the wireless device for the BWP switching such that the wireless device responsively switches from an active BWP to a specified BWP other than a default BWP at least (i) after having successfully completed a physical downlink shared control channel, PDCSH, reception, or (ii) having successfully completed a physical uplink control channel, PUCCH, transmission.

2. A wireless device configured to communicate with a network node, the wireless device comprising:
processing circuitry configured to:
receive signaling of switching information for Bandwidth Part (BWP) switching from the network node, the signaling of switching information being absent of shared channel scheduling information, and the signaling of switching information pre-configuring the wireless device for the BWP switching such that the wireless device responsively switches from an active BWP to a specified BWP other than a default BWP at least (i) after having successfully completed a physical downlink shared control channel, PDCSH, reception, or (ii) having successfully completed a physical uplink control channel, PUCCH, transmission; and
perform the BWP switching based at least in part on the switching information.

3. A method implemented by a network node that is configured to communicate with a wireless device, the method comprising causing signaling of switching information for Bandwidth Part (BWP) switching to the wireless device, the signaling of switching information being absent of shared channel scheduling information, and the signaling of switching information pre-configuring the wireless device for the BWP switching such that the wireless device responsively switches from an active BWP to a specified BWP other than a default BWP at least (i) after having successfully completed a physical downlink shared control channel, PDCSH, reception, or (ii) having successfully completed a physical uplink control channel, PUCCH, transmission.

4. The method of claim 3, wherein the signaling of switching information further pre-configures the wireless device for the BWP switching based at least in part on another predetermined action at the wireless device.

5. The method of claim 4, wherein the another predetermined action at the wireless device includes one of:
a physical uplink shared channel transmission; and
an expiration of a timer.

6. The method of claim 3, wherein the signaling of switching information comprises radio resource control, RRC, signaling.

7. The method of claim 3, wherein the specified BWP is a narrower BWP than the active BWP.

8. A method implemented by a wireless device that is configured to communicate with a network node, the method comprising:
receiving signaling of switching information for Bandwidth Part switching from the network node, the signaling of switching information being absent of shared channel scheduling information, and the signaling of switching information pre-configuring the wireless device for the BWP switching such that the wireless device responsively switches from an active BWP to a specified BWP other than a default BWP at least (i) after having successfully completed a physical downlink shared control channel, PDCSH, reception, or (ii) having successfully completed a physical uplink control channel, PUCCH, transmission; and
performing the BWP switching based at least in part on the switching information.

9. The method of claim 8, wherein the signaling of switching information further pre-configures the wireless device for the BWP switching based at least in part on another predetermined action at the wireless device.

10. The method of claim 9, wherein the another predetermined action at the wireless device includes one of:
a physical uplink shared channel transmission; and
an expiration of a timer.

11. The method of claim 8, wherein the signaling of switching information comprises radio resource control, RRC, signaling.

12. The method of claim 8, wherein the specified BWP is a narrower BWP than the active BWP.

* * * * *